(12) United States Patent
Humair et al.

(10) Patent No.: US 12,533,229 B2
(45) Date of Patent: Jan. 27, 2026

(54) REPLACEMENT HEART VALVE HAVING IMPROVED COLLAPSIBLE SEAL

(71) Applicant: Symetis SA, Ecublens (CH)

(72) Inventors: Arnaud Humair, Mont-sur-Rolle (CH); Jean-Luc Hefti, Cheseaux-Noréaz (CH); Stephane Delaloye, Buelach (CH)

(73) Assignee: Symetis SA, Ecublens (CH)

( * ) Notice: Subject to any disclaimer, the term of this patent is extended or adjusted under 35 U.S.C. 154(b) by 276 days.

(21) Appl. No.: 17/466,438

(22) Filed: Sep. 3, 2021

(65) Prior Publication Data

US 2022/0061986 A1    Mar. 3, 2022

(30) Foreign Application Priority Data

Sep. 3, 2020 (EP) ..................................... 20194410

(51) Int. Cl.
*A61F 2/24* (2006.01)
(52) U.S. Cl.
CPC .......... *A61F 2/2418* (2013.01); *A61F 2/2427* (2013.01); *A61F 2210/0061* (2013.01); *A61F 2250/0069* (2013.01)
(58) Field of Classification Search
CPC ............ A61F 2250/0069; A61F 2/2418; A61F 2/2409
See application file for complete search history.

(56) References Cited

U.S. PATENT DOCUMENTS

| 2006/0004442 | A1 | 1/2006 | Spenser et al. |
| 2012/0022629 | A1 | 1/2012 | Perera et al. |
| 2014/0350668 | A1 | 11/2014 | Delaloye et al. |
| 2015/0005863 | A1 | 1/2015 | Para |
| 2015/0209136 | A1* | 7/2015 | Braido .................. A61F 2/2418 623/2.18 |

(Continued)

FOREIGN PATENT DOCUMENTS

| EP | 2898859 | 7/2015 |
| EP | 3679893 | 7/2020 |

OTHER PUBLICATIONS

"Extended European Search Report," for European Patent Application No. 21194458.2 mailed Jan. 17, 2022 (8 pages).

(Continued)

*Primary Examiner* — Sarah W Aleman
(74) *Attorney, Agent, or Firm* — Pauly, DeVries Smith & Deffner LLC

(57) ABSTRACT

Embodiments herein relate to cardiac stent-valves for transcatheter delivery. A cardiac stent-valve for transcatheter delivery is compressible to a compressed state for delivery and expandable to an expanded state for implantation. The stent-valve can include a stent with an axial inflow end and an axial outflow end, a plurality of leaflets arranged within the stent, and a structured sealing skirt for reduction or prevention of paravalvular leakage. The structured sealing skirt comprises one or more sealing formations arranged on a radially outer surface of the structured sealing skirt. At least in the expanded state, at least one of the one or more sealing formations is shaped and arranged such that, at each axial level of the structured sealing skirt covered by the one or more sealing formations. Other embodiments are also included herein.

19 Claims, 5 Drawing Sheets

(56) References Cited

U.S. PATENT DOCUMENTS

| | | | |
|---|---|---|---|
| 2015/0209141 A1* | 7/2015 | Braido | A61F 2/2418 623/2.17 |
| 2015/0327995 A1 | 11/2015 | Morin et al. | |
| 2017/0056166 A1 | 3/2017 | Ratz et al. | |
| 2017/0189174 A1* | 7/2017 | Braido | A61F 2/2436 |
| 2018/0021129 A1 | 1/2018 | Peterson et al. | |
| 2018/0055631 A1 | 3/2018 | Morin et al. | |
| 2019/0060063 A1* | 2/2019 | Griffin | A61F 2/2418 |
| 2019/0201193 A1 | 7/2019 | Delaloye et al. | |
| 2020/0069415 A1 | 3/2020 | Bialas et al. | |
| 2020/0121454 A1* | 4/2020 | Spence | A61F 2/2445 |
| 2020/0170778 A1* | 6/2020 | Ehnes | A61F 2/82 |
| 2022/0061984 A1 | 3/2022 | Humair et al. | |
| 2023/0218390 A1 | 7/2023 | Pisani et al. | |

OTHER PUBLICATIONS

"Extended European Search Report," for European Patent Application No. 21194471.5 mailed Jan. 17, 2022 (7 pages).
"Extended European Search Report," for European Patent Application No. 20194408.9 mailed Jun. 30, 2021 (8 pages).
"Extended European Search Report," for European Patent Application No. 20194410.5 mailed Jun. 30, 2021 (7 pages).
"Non-Final Office Action," for U.S. Appl. No. 17/466,431 mailed May 4, 2023 (24 pages).
"Response to Communication Pursuant to Rules 70(2) and 70a(2)/Rule 39(1)," for European Patent Application No. 20194408.9 filed Sep. 9, 2022 (15 pages).
"Response to Communication Pursuant to Rules 70(2) and 70a(2)/Rule 39(1)," for European Patent Application No. 20194410.5 filed Sep. 9, 2022 (9 pages).
"Response to Communication Pursuant to Rules 70(2) and 70a(2)/Rule 39(1)," for European Patent Application No. 21194458.2 filed Sep. 9, 2022 (6 pages).
"Response to Communication Pursuant to Rules 70(2) and 70a(2)/Rule 39(1)," for European Patent Application No. 21194471.5 filed Sep. 9, 2022 (6 pages).
"Response to Non-Final Rejection," mailed on May 4, 2023, for U.S. Appl. No. 17/466,431, submitted via EFS-Web on Jul. 18, 2023, 14 pages.
"Final Office Action," for U.S. Appl. No. 17/466,431 mailed Nov. 20, 2023 (18 pages).
"Non-Final Office Action," for U.S. Appl. No. 17/466,431 mailed Apr. 10, 2024 (20 pages).
"Response to Final Rejection," mailed on Nov. 20, 2023, for U.S. Appl. No. 17/466,431, submitted via EFS-Web on Feb. 20, 2024, 12 pages.
"Non-Final Office Action," for U.S. Appl. No. 17/466,431 mailed Feb. 19, 2025 (20 pages).
"Response to Final Rejection," mailed on Apr. 10, 2024, for U.S. Appl. No. 17/466,431, submitted via EFS-Web on Jul. 10, 2024, 12 pages.
"Response to Non-Final Office Action," for U.S. Appl. No. 17/466,431, filed May 19, 2025 (11 pages).
"Communication pursuant to Article 94(3)," for European Patent Application No. 20194408.9 mailed Aug. 8, 2025 (7 pages).
"Communication pursuant to Article 94(3)," for European Patent Application No. 21194458.2 mailed Aug. 7, 2025 (8 pages).
"Notice of Allowance," for U.S. Appl. No. 17/466,431 mailed Aug. 8, 2025 (9 pages).

\* cited by examiner

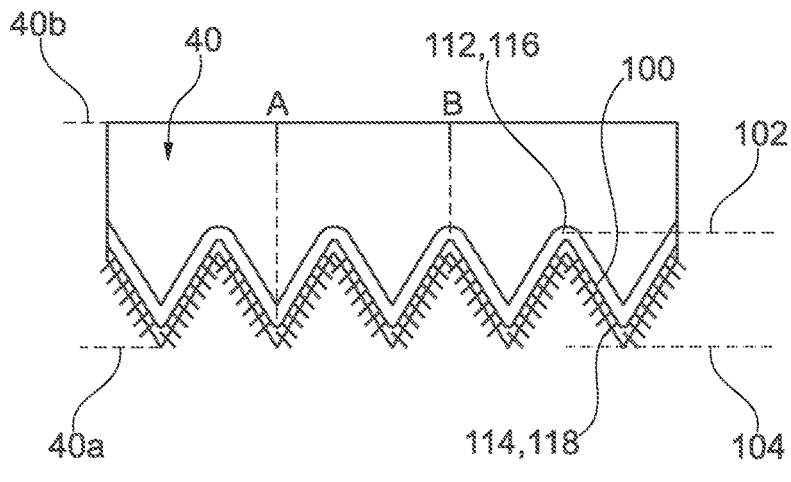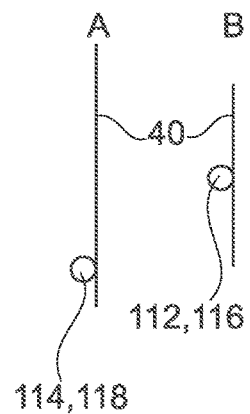
Fig. 4a   Fig. 4b   Fig. 4c
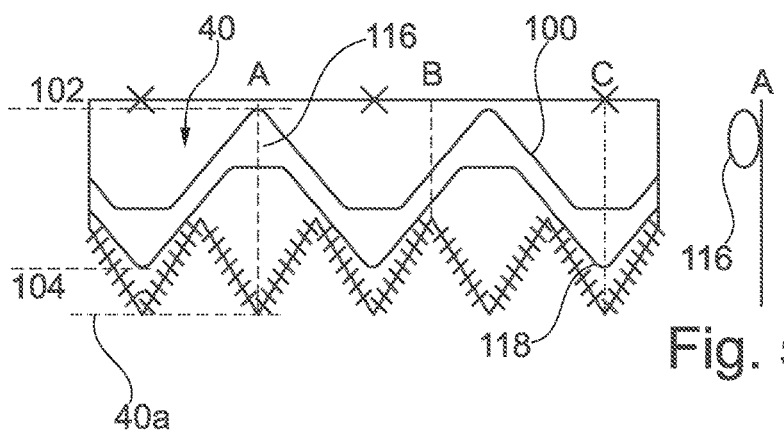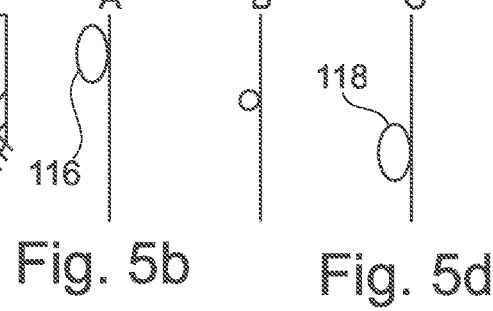
Fig. 5a   Fig. 5b   Fig. 5c   Fig. 5d
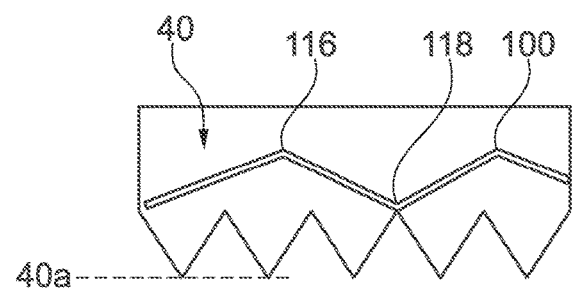
Fig. 6

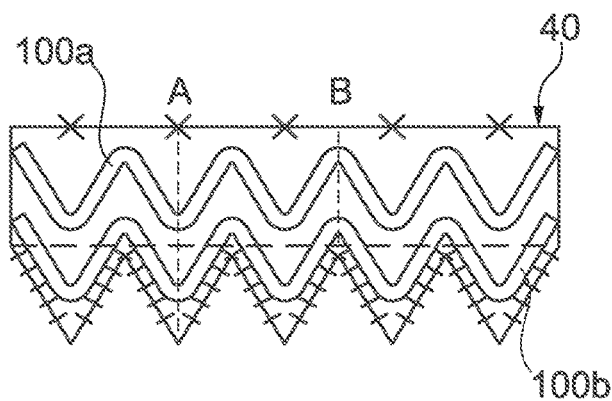
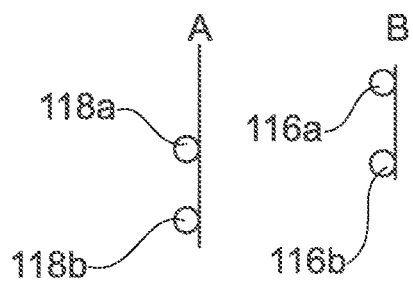
Fig. 7a        Fig. 7b   Fig. 7c
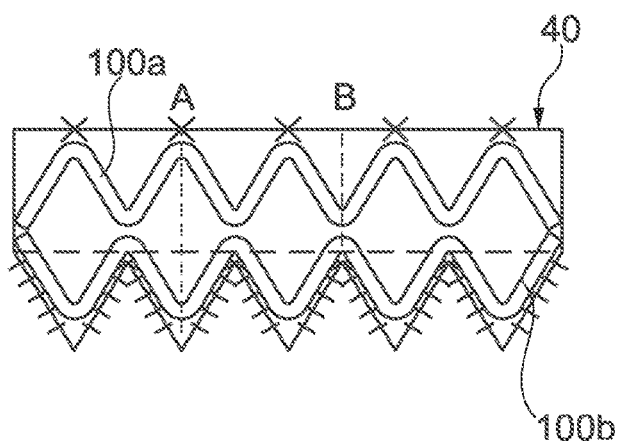
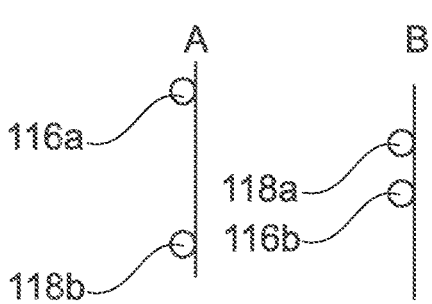
Fig. 8a        Fig. 8b   Fig. 8c
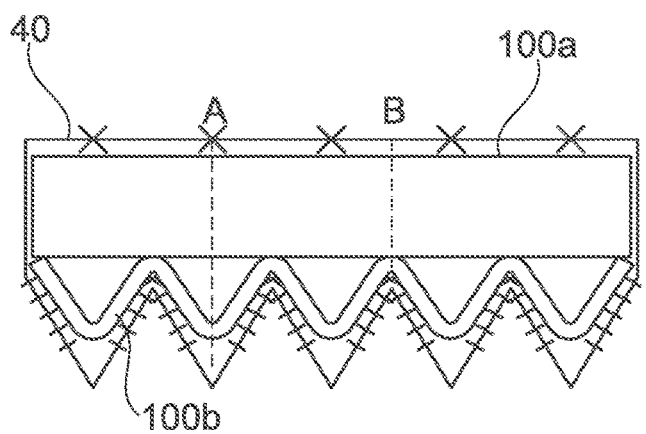
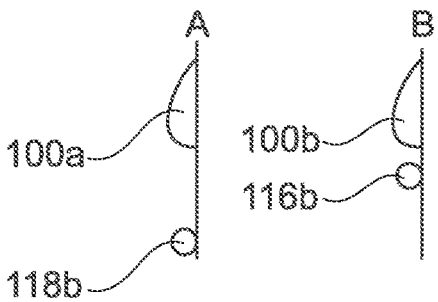
Fig. 9a        Fig. 9b   Fig. 9c

REPLACEMENT HEART VALVE HAVING IMPROVED COLLAPSIBLE SEAL

CLAIM OF PRIORITY

This application claims the benefit of European Patent Application No. EP20194410.5, filed on Sep. 3, 2020, the disclosure of which is incorporated herein by reference.

TECHNICAL FIELD

The present disclosure relates to the field of transcatheter stent-valves. In some non-limiting aspects, the stent-valve may be a cardiac replacement valve, for example, an aortic or mitral replacement valve.

BACKGROUND

Transcatheter valve implantation (for example, transcatheter aortic valve implantation (TAVI)) is an evolving technology for replacement valve therapy that (i) avoids the trauma of conventional open-chest surgery, and (ii) avoids the need for heart and lung bypass. In such a technique, a stent-valve is compressed and loaded into a delivery catheter. The delivery catheter is introduced to the desired site of implantation (for example at the heart) via a percutaneous route or via minimally invasive surgery. The stent-valve is deployed into the implantation position from or by the delivery catheter, and the delivery catheter is then withdrawn.

Despite the successes of transcatheter stent-valves, technological challenges remain. One such challenge is reducing residual leakage of blood around the stent-valve (so called paravalvular leakage). The above stents form a friction fit with the native anatomy to anchor the stent-valve in position, and are generally round in cross-section. However the native anatomy in which the stent is implanted is often more irregular and varies from patient to patient. Moreover, heavy calcification of the native anatomy may obstruct full deployment of a stent, and make the native anatomy even more irregular. Thus, without taking further measures, it can be difficult to obtain sufficient sealing around the stent-valve.

In order to address paravalvular leakage, it is known to incorporate an outer skirt or cover as part of the stent-valve. Generally speaking, it can be expected that the thicker or more voluminous the material of the skirt, the better able the skirt is to occlude gaps and effect a seal. Thus, it would be desirable to provide a very voluminous outer skirt. However, a disadvantage is that such skirts add to the bulk of the stent-valve. A voluminous skirt makes the stent-valve problematic to compress to a desirably small cross-sectional size for delivery.

SUMMARY

In a first aspect, the present disclosure relates to a cardiac stent-valve for transcatheter delivery. The stent-valve may be compressible to a compressed state for delivery, and expandable to an expanded state for implantation. The stent-valve may comprise a stent, a plurality of leaflets and a structured sealing skirt. The stent may have an axial inflow end and an axial outflow end. The plurality of leaflets may be arranged within the stent. The structured sealing skirt may be configured for reduction or prevention of paravalvular leakage. The structured sealing skirt may comprise one or more sealing formations. The one or more sealing formations may be arranged on a radially outer surface of the structured sealing skirt. At least in the expanded state, at least one of the one or more sealing formations may be shaped and arranged such that at each axial level of the structured sealing skirt covered by the one or more sealing formations, the fraction of the radially outer surface occupied by the one or more sealing formations is less than 100%, specifically less than about 90%, more specifically less than about 80%, and in particular less than about 70%.

In some embodiments, the fraction of the radially outer surface occupied by the one or more sealing formations may be less than about 60%, specifically less than about 50%, more specifically less than about 40%, and in particular less than about 30% at each axial level of the structured sealing skirt.

In some embodiments, at least in the expanded state, the fraction occupied by the one or more sealing formations differs at a first axial level of the structured sealing skirt from the fraction occupied by the one or more sealing formations at least at a second axial level of the structured sealing skirt. Additionally or alternatively, the fraction occupied by the one or more sealing formations may vary at different axial levels covered by the sealing formation. In some embodiments, at at least one axial level, the fraction may be in the range of about 40% to about 50%. Additionally or alternatively, at at least one (e.g. other) axial level, the fraction may be in the range of about 20% to about 30%.

In some embodiments, at least in the expanded state, it may be advantageous that at least one of the one or more sealing formations has a meandering shape extending circumferentially around the structured sealing skirt. Additionally or alternatively, the sealing formation may not include a substantial step-change in an axial direction between two axial levels, but may rather meander progressively around the circumference between axial levels. The meandering shape may result in that the one or more sealing formations occupy only a fraction of the radially outer surface of the structured sealing skirt as set out further above. Depending on the specification of the meandering shape of the sealing formation, the fraction may, for instance, be generally in the range of about 20% to about 70%. The provision of a sealing formation in a meandering shape may reduce a concentration of material at a single axial level on the skirt, which could otherwise impact compressibility. In some embodiments, at least one of the one or more sealing formations may extend circumferentially around the structured sealing skirt in a wavy shape, a zigzag shape, a sinuous shape, or other meandering linear, curved or curvilinear shape. In some embodiments, at least one of the one or more sealing formations may extend continuously or intermittently at least about an angle of about 180°, specifically at least about an angle of about 270°, more specifically at least about an angle of about 360° along a circumference of the radially outer surface of the structured sealing skirt. In some embodiments, the meandering shape of at least one of the one or more sealing formations may have a generally closed loop shape. Additionally or alternatively, the meandering shape of at least one of the one or more sealing formations may have a loop shape with one or more interruptions. Additionally, the number of interruptions may be at least one, optionally at least two, optionally at least three, optionally at least four, optionally at least five, optionally at least six, optionally at least seven, optionally at least eight, optionally at least nine, optionally at least ten. In some embodiments, in the expanded state, a thickness of at least one of the one or more sealing formations may vary in direction along the meandering shape. Additionally or alternatively, a height of at least one of the one or more sealing formations may vary in direction along the meandering shape. In some embodiments, in the expanded state, the one or more sealing formations may project radially outward from the radially outer surface of the structured sealing skirt to a height of no more than about 5 mm, more specifically no more than about 4 mm, and in particular no more than about 3 mm.

In some embodiments, the meandering shape may alternate between an upper apex a first axial height and a lower apex at a second axial height. Additionally, the meandering shape may be formed by one or more circumferentially adjacent repeat units. Additionally, a repeat unit may extend between two adjacent upper apexes. Additionally or alternatively, a repeat unit may extend between two adjacent lower apexes. In some embodiments, a number of repeat units of the meandering shape extending circumferentially around the structured sealing skirt may be at least two, optionally at least three, optionally at least four, optionally at least five, optionally at least six, optionally at least seven, optionally at least eight, optionally at least nine, optionally at least ten. In some embodiments, the repeat units may comprise one or more repeat units selected from V-shaped units pointing towards the inflow end, V-shaped units pointing towards the outflow end, W-shaped units pointing towards the inflow end, W-shaped units pointing towards the outflow end, U-shaped units pointing towards the inflow end, or U-shaped units pointing towards the inflow end. In some embodiments, in the expanded state, the upper apexes may be at least partly filled with sealing material. Additionally or alternatively, in the expanded state, the lower apexes may be at least partly filled with sealing material.

In some embodiments, the stent may comprise a lattice structure of cells defined by interconnected struts defining a repeating pattern along the circumference. Additionally, at least a portion the meandering shape of the one or more sealing formations may not follow the underlying struts. In some embodiments, the entire meandering shape of the one or more sealing formations may not follow the underlying struts. In some embodiments, the meandering shape of the one or more sealing formations may have a circumferential repeat distance or "period" that equals a cell width of the lattice structure, optionally, such that the sealing formation may be shaped as the zigzag shape of the underlying stent struts. Alternatively, the meandering shape of the one or more sealing formations may have a circumferential repeat distance or "period" that is longer or shorter than a cell width of the lattice structure, optionally, such that the sealing formation may not be shaped as the zigzag shape of the underlying stent struts. In other words, the meandering shape may comprise repeat units which have the same, a smaller or a larger dimension, in particular circumferential dimension, than the cell width of the lattice structure of the stent. In some embodiments, the meandering shape of the one or more sealing formations may be axially offset to the underlying struts. Additionally or alternatively, the meandering shape of the one or more sealing formations may be circumferentially offset to the underlying struts. In other words, the meandering shape may be slightly axially and/or circumferentially offset from the struts and/or from an adjacent edge of the structured sealing skirt, to provide space to attach, specifically to suture, the structured sealing skirt to the underlying struts and to avoid a concentration of material at a single axial level on the structured sealing skirt. In some embodiments, the stent may comprise a lattice structure of diamond-shaped cells having axial apexes and wherein one or more of the upper apexes, in particular all of the upper apexes, and/or one or more of the lower apexes, in particular all of the lower apexes, of the meandering shape are axially offset to the axial apexes of the diamond-shaped cells. Additionally or alternatively, the stent may comprise a lattice structure of diamond-shaped cells having axial apexes and wherein one or more of the upper apexes, in particular all of the upper apexes, and/or one or more of the lower apexes, in particular all of the lower apexes, of the meandering shape are circumferentially offset to the axial apexes of the diamond-shaped cells. Additionally or alternatively, the upper apexes and/or the lower apexes of the meandering shape, i.e. of the one or more sealing formations, may be arranged at a position overlapping with an underlying cell, in particular with an interior of an underlying cell. In some embodiments, the upper apexes and/or the lower apexes of the meandering shape, i.e. of the one or more sealing formations, may be arranged at a position centrally overlapping with an underlying cell. Additionally or alternatively, the upper apexes may be arranged such that the upper apexes do not overlap with the underlying struts of the stent. Additionally or alternatively, the lower apexes may be arranged such that the lower apexes do not overlap with the underlying struts of the stent. Thereby, a concentration of material at a single axial level on the structured sealing skirt particularly in a compressed state may be avoided or reduced. Additionally or alternatively, the apexes of the meandering shape, i.e. of the one or more sealing formations, may be at least partly compressed into the cells.

In some embodiments, at least one of the one or more sealing formations may have a generally closed loop shape. Additionally or alternatively, at least one of the one or more sealing formations may have a loop shape with one or more interruptions. Additionally, the number of interruptions may be at least one, optionally at least two, optionally at least three, optionally at least four, optionally at least five, optionally at least six, optionally at least seven, optionally at least eight, optionally at least nine, optionally at least ten. In some embodiments, the number of interruptions may be less, specifically half the number of repeat units of a meandering shape. In some embodiments, the number of interruptions may equal the number of repeat units of a meandering shape. In some embodiments, the number of interruptions may be more, specifically double the number of repeat units of a meandering shape. In some embodiments, the interruptions may be located at the upper apexes of the meandering shape. Additionally or alternatively the interruptions may be located at the lower apexes of the meandering shape. Additionally or alternatively the interruptions may be located in between the upper and lower apexes.

In some embodiments, at least one of the one or more sealing formations may extend over at least about 50% of an axial height of the structured sealing skirt, specifically at least about 60%, more specifically at least about 70%, and in particular at least about 80%. Alternatively, the one of the one or more sealing formations may cover in combination at least about 50% of an axial height of the structured sealing skirt, specifically at least about 60%, more specifically at least about 70%, and in particular at least about 80%. Additionally or alternatively, at least one of the of one or more sealing formations may cover at most about 10% of an axial height of the structured sealing skirt, specifically at most about 15%, more specifically at most about 20%, and in particular at most about 25% or at most about 30%.

In some embodiments, the structured sealing skirt may have a first sealing skirt end arranged towards the axial inflow end and a second sealing skirt end arranged towards the axial outflow end. Additionally, at least in the expanded state, at least one of the one or more sealing formations may be positioned towards the first sealing skirt end. Additionally or alternatively, at least one of the one or more sealing formations may be positioned at or axially adjacent to the first sealing skirt end. Additionally or alternatively, at least in the expanded state, at least one of the one or more sealing formations may be positioned towards the second sealing skirt end. Additionally or alternatively, at least one of the one or more sealing formations may be positioned at or axially adjacent to the second sealing skirt end.

In some embodiments, the one or more sealing formations may comprise a first sealing formation and a second sealing formation. Additionally or alternatively, at least in the expanded state, the first sealing formation and the second sealing formation may be axially offset from each other. Additionally, the first sealing formation and the second sealing formation may be axially spaced from each other. In some embodiments, the second sealing formation may generally have the same shape as the first sealing formation. Additionally or alternatively, the second sealing formation may be arranged in register with shape features of the first sealing formation. Alternatively, the second sealing formation may be arranged not in register with shape features of the first sealing formation. In some embodiments, the structured sealing skirt may comprise more than two, for instance three sealing formations, optionally four sealing formations, optionally five sealing formations or more than five sealing formations.

In some embodiments, in the expanded state, the one or more sealing formations may project radially outward from the surface of the structured sealing skirt to a height of no more than about 5 mm, more specifically no more than about 4 mm, and in particular no more than about 3 mm.

In some embodiments, the one or more sealing formations may comprise material that is configured to expand or swell in response to contact with liquids. In some embodiments, it may be advantageous that the one or more sealing formations comprise material that is configured to expand or swell in response to contact with blood. In some embodiments, the one or more sealing formations may comprise fibrous material. In some embodiments, it may be particularly useful, that the one or more sealing formations are formed of fibrous material. In some embodiments, the one or more sealing formations may comprise material chosen from open or closed cell porous material, specifically an open cell porous material, and in particular an open cell porous material configured to facilitate endothelialization of the one or more sealing formations. In some embodiments, the one or more sealing formations may have a void content of more than about 30%, more specifically more than about 40% and in particular more than about 50%. This feature may allow a good compression of the stent valve, in particular the structured sealing skirt and the one or more sealing formations, in the compressed state.

In some embodiments, the one or more sealing formations may be attached to or integrally formed with the structured sealing skirt.

In some embodiments, the one or more sealing formations may be made of any suitable biocompatible material, for example, biological tissue (for example, pericardial tissue such as porcine or bovine pericardial tissue), metal (e.g. a metal foil), or a synthetic material.

In some embodiments, the structured sealing skirt may be formed of material selected from: biologic materials, polymeric materials, fabric materials, permeable materials, impermeable materials, materials that promote tissue ingrowth, foam materials, sealing materials, and combinations thereof. In some embodiments, the structured sealing skirt may be formed of material selected from: biological tissue, for instance pericardial tissue, metal, for instance metal foil, synthetic material and combinations thereof. Additionally or alternatively, the synthetic material may be selected from: fabric; hydrogel; foam; sponge; porous fibrous material.

In some embodiments, the one or more sealing formations may be formed of the same or of a different material than the structured sealing skirt.

In some embodiments, the structured sealing skirt may be arranged on the exterior of the stent. Additionally or alternatively, the structured sealing skirt may be arranged radially outside of the stent. In some embodiments, the structured sealing skirt may be attached to stent. Additionally or alternatively, the structured sealing skirt may be attached to the stent on an exterior of the stent. Additionally only a portion of the structured sealing skirt may be attached to the stent on an exterior of the stent. Additionally or alternatively, the structured sealing skirt may be attached to stent on an interior of the stent. Additionally only a portion of the structured sealing skirt may be attached to the stent on an interior of the stent. In some embodiments the structured sealing skirt may be an outer skirt. In some embodiments, the structured sealing skirt may be an everted portion of an inner skirt. In some embodiments, the structured sealing skirt may be an outer skirt and may form a pocket with an inner skirt.

In some embodiments, the stent may comprise at least one of: a lower tubular portion, an upper crown portion, a plurality of upstanding commissural supports, and/or a plurality of stabilization arches. In some embodiments, the stent may comprise the lower tubular portion. In some embodiments, the stent may comprise the lower tubular portion, the upper crown portion, a plurality of upstanding commissural supports, and the plurality of stabilization arches. In some embodiments, the lower tubular portion may communicate with the upper crown and the commissural supports. Alternatively or additionally, the commissural supports may upstand relative to the upper crown portion. Alternatively or additionally, the stabilization arches may communicate with the commissural supports. In some embodiments, specifically at least in the expanded state, the one or more sealing formations may be positioned between and spaced from respective extremities of both a free edge of the upper crown portion, and a free edge of the lower tubular portion. In some embodiments, specifically at least in the expanded state, at least one of the one or more sealing formations may be arranged at an axial height of the lower tubular portion. Alternatively or additionally, at least one of the one or more sealing formations may be arranged at an axial height of an extremity of the lower tubular portion the furthest away from the axial inflow end. In some embodiments, the stent may comprise an extremity formed with a substantially zig-zag shape at the axial inflow end. Additionally, an edge of the structured sealing skirt at a first sealing skirt end has a zig-zag shape that matches substantially the zig-zag shape of the stent.

In some embodiments, at least one of the one or more sealing formations does not extend in a straight circumferential direction. In some embodiments, each of the one or more sealing formations does not extend in a straight circumferential direction.

In some embodiments, at least in the expanded state, at least one of the one or more sealing formations may comprise a plurality of circumferentially distributed sub-portions. Additionally or alternatively, each of the plurality of circumferentially distributed sub-portions may have a lengthy shape and may extend from a first end at a first axial height to a second end at a second axial height. Additionally or alternatively, two adjacent sub-portions may be shaped and arranged such that their first ends are closer in a circumferential direction than their second ends or vice versa. In some embodiments, two adjacent sub-portions may be connected, in particular directly connected to each other, at those ends which are closer together than the respective other ends. Additionally or alternatively, two adjacent sub-portions may be unconnected to each other, at those ends which are farther away from each other than the respective other ends. In some embodiments, at least in the expanded state, the plurality of sub-portions may be configured and arranged, such that, during a transition from a compressed state to an expanded state, the first ends and/or the second ends of two adjacent sub-portions are moved away from each other circumferentially.

Additional details and features of the invention are described with reference to the drawings as follows.

DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

FIG. 4a is a schematic partial front view of a structured sealing skirt 40 having a first example sealing formation 100;

FIG. 4b is a schematic section along the line A of FIG. 4a;
FIG. 4c is a schematic section along the line B of FIG. 4a;
FIG. 5a is a schematic partial front view of a structured sealing skirt 40 having a second example sealing formation 100;
FIG. 5b is a schematic section along the line A of FIG. 5a;
FIG. 5c is a schematic section along the line B of FIG. 5a;
FIG. 5d is a schematic section along the line C of FIG. 5a;
FIG. 6 is a schematic partial front view of a structured sealing skirt 40 having a third example sealing formation 100;
FIG. 7a is a schematic partial front view of a structured sealing skirt 40 having a fourth example of sealing formation 100;
FIG. 7b is a schematic section along the line A of FIG. 7a;
FIG. 7c is a schematic section along the line B of FIG. 7a;
FIG. 8a is a schematic partial front view of a structured sealing skirt 40 having a fifth example of sealing formation 100;
FIG. 8b is a schematic section along the line A of FIG. 8a;
FIG. 8c is a schematic section along the line B of FIG. 8a;
FIG. 9a is a schematic partial front view of a structured sealing skirt 40 having a sixth example of sealing formation 100;
FIG. 9b is a schematic section along the line A of FIG. 9a;
FIG. 9c is a schematic section along the line B of FIG. 9a.

DETAILED DESCRIPTION

Figure 1:
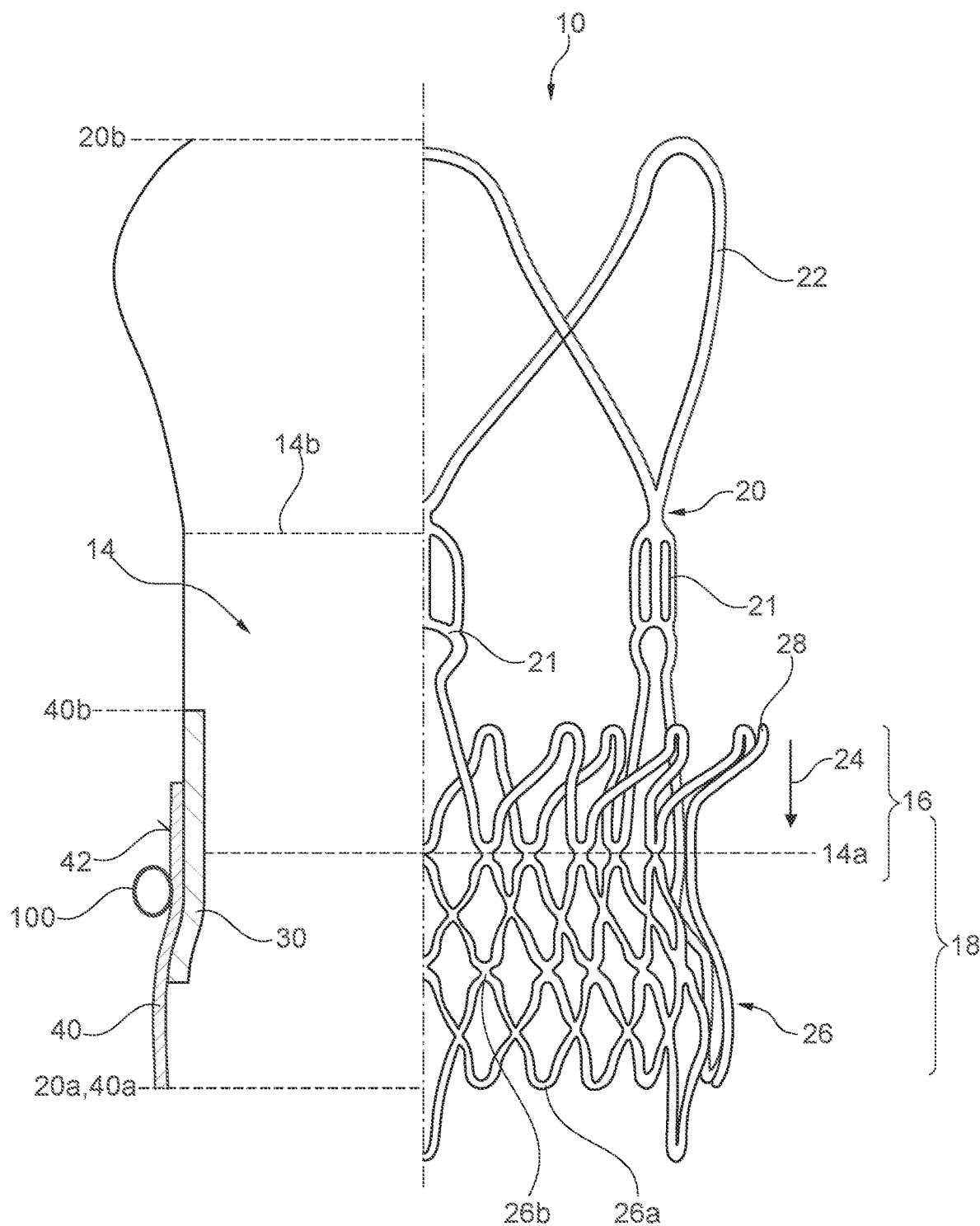
FIG. 1 is a schematic drawing illustrating a stent-valve 10 with a structured sealing skirt 40 comprising a sealing formation 100 in a split view showing a side cut and a front view.

Hereinafter, a detailed description will be given of the present disclosure. The terms or words used in the description and the claims of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

Referring to the drawings, a stent-valve 10 is illustrated for transcatheter implantation. The stent-valve 10 may be a cardiac stent-valve, for example, an aortic stent-valve, a mitral stent-valve, a pulmonary stent-valve or a tricuspid stent-valve, for implantation at the respective valve position in a human heart. The stent-valve 10 may generally comprise at least a stent 20, a plurality of valve leaflets 14 supported by the stent, and a skirt, for example, a structured sealing skirt 40. The structured sealing skirt 40 is configured for preventing or reducing paravalvular leakage. In other words, the structured sealing skirt 40 is configured for obstructing para-valve leakage.

More detail is now described about exemplary stent-valves 10 for which the structured sealing skirts 40 of the present disclosure are especially suitable, although it will be appreciated that this detail is non-limiting on the scope of the present disclosure, and that the structured sealing skirts 40 disclosed herein may be used on many different types and shapes of stent-valves.

The stent-valve 10 may optionally comprise biological tissue (for example, pericardium (such as porcine pericardium and/or bovine pericardium) and/or natural cardiac valve leaflets (for example, natural porcine cardiac valve leaflets, optionally attached to a portion of natural cardiac wall tissue). The biological tissue may be fixed, for example, using glutaraldehyde. The biological tissue may have anti-calcification properties, for example, having been treated or processed to inhibit or slow calcification (for example, by treatment in alcohol or a process using detergent). The biological tissue may be stored in a liquid storage solution, or it may be stored in a substantially dehydrated form. The stent-valve 10 may also comprise synthetic material (e.g. fabric or electrospun polymer) for the leaflets and/or one or more skirts.

The stent-valve 10 may be compressible to a radially compressed state (not shown) for delivery using a delivery catheter, and be expandable to or towards an expanded state (as shown in FIG. 1) at implantation. In the context of this disclosure an "expanded state" may be a nominally expanded state, which represents a maximally extended state in air. Furthermore, a deployed state (e.g. deployed at an implantation site) may be a state in between the compressed state and the (nominally) expanded state. For instance, a deployed state may be an expansion of about 50% to about 100%, specifically about 70% to about 100% and more specifically about 90% to about 100% of an expansion in the (nominally) expanded state. During transition from the compressed state (e.g. radially compressed state) to or towards the expanded state (e.g. radially expanded state), a tubular region of the stent 20 may increase in diameter and/or may decrease in axial length.

Various geometries of stent 20 may be used. In some embodiments, the stent 20 may include one of more of: a first tubular portion (also referred to as first/lower (crown) portion, first/lower crown) 26; a second crown portion (also referred to as upper crown portion, second/upper crown) 28; a plurality of upstanding commissural supports 21; and a plurality of stabilization arches 22. Depending on the intended use, the first portion 26 of the stent 20 may be configured to be deployed after the other regions of the stent 20 have first been at least partly deployed. For example, the arches 22, the supports 21 and the second crown 28 may be deployed at least partly before the first portion 26 (in that order, or in reverse order, or in a different order). At least once the second crown 28 has been at least partly deployed, the stent 20 may be urged and/or displaced in the direction of arrow 24 to seat the second crown 28 against native leaflets at the implantation site. Deploying the first portion 26 last fixes the stent 20 in its final position.

In some embodiments, at least the first portion 26, and optionally a portion of the second crown 28, may be formed by a lattice structure of the stent. The lattice structure may define apertures (also referred to as cells), for example, generally diamond-shaped apertures. The lattice structure may be formed by interconnected struts (see, for instance FIGS. 1 to 3b).

The native leaflets may generally overlap a portion 16 of the stent. The native valve annulus and/or inflow tract may overlap a portion 18 of the stent.

Optionally, the stent-valve 10 may further comprise an inner skirt 30 communicating with the leaflets 14 and carried on an interior of the stent 20. Additionally or alternatively, the stent-valve 10 may further comprise an outer skirt, for example the structured sealing skirt 40, carried on an exterior of the stent 20. When both skirts are provided, the skirts may partially overlap. The skirts may be offset such that one skirt (e.g. the outer skirt 40) extends further towards a lower extremity of the stent 20 than the other (e.g. inner skirt 30). Additionally or alternatively, one skirt (e.g. the inner skirt 30) extends further towards an upper extremity of the stent 20 than the other (e.g. outer skirt 40). The skirts may be of any suitable flexible and/or compliant material, for example, synthetic material (e.g. of PET, or PEEK), or of biological tissue (e.g. of pericardial tissue, such as porcine or bovine pericardial tissue). Synthetic material may be used in any suitable form, for example, as a fabric (e.g. woven, non-woven, or knitted), or as a film, or a fabric/film composite.

Optionally, at least the outer skirt 40 may be positioned to leave (e.g. at least a portion of) the upper crown 28 substantially unobscured by the outer skirt 40. Such an arrangement may assist good blood flow to the coronary arteries (for example, in the case of a stent-valve for the aortic valve).

In some embodiments, the first portion 26 has an extremity formed with a substantially zig-zag shape. The zig-zag shape may comprise lower stent apexes 26a and upper stent apexes 26b. The upper stent apexes 26b may be masked in FIG. 1 by the superimposed presentation of both the frontmost and rearmost cells of the lattice structure. The zig-zag shape may be substantially continuous around the circumference of the stent 20. The outer skirt 40 may have at least one edge having a zig-zag shape that matches substantially the zig-zag shape of the extremity of the first portion 26 (see, for instance FIGS. 2a to 3b). For example, the edge of the skirt may be an edge closest to the extremity of the first portion, and/or an edge remote from the extremity of the first portion. Such an arrangement can avoid excessive material at the extremity, and thereby facilitate crimping of the stent-valve 10. At the same time, the outer skirt 40 may cover (for example, completely) open cells of the lattice structure to the stent extremity to reduce risk of blood leakage through the apertures of the cells. The outer skirt 40 may also provide a layer of material over the struts of the stent, thereby to cushion the engagement between the stent and the sensitive native heart tissue.

The valve 14 may comprise biological tissue, for example, pericardial tissue (such as porcine pericardial tissue or bovine pericardial tissue) or natural cardiac valve leaflets (for example, natural porcine cardiac valve leaflets, optionally attached to a portion of natural cardiac wall tissue). Other biological or non-biological material could also be used for the valve 14, as desired.

The stent 20 may optionally be of a self-expanding type that is compressible to the compressed state for loading into a delivery catheter having a sheath for constraining the stent 20 in the compressed state for delivery to the site of implantation. In use, by removal of the constraining effect of the sheath, the stent 20 self-expands to or (e.g. at least partly) towards the expanded state. A self-expanding stent may, for example, be of shape-memory material, for example, shape-memory metal alloy, for example, nitinol. Additionally or alternatively, the stent 20 may be configured to be expanded by application of an expanding force from the delivery catheter, such as by using an expansion balloon.

In the following, more detail is now described about the stent-valve 10 including the structured sealing skirts 40 of the present disclosure.

In a first aspect, the present disclosure relates to a cardiac stent-valve 10 for transcatheter delivery (see FIG. 1). As explained above, the stent-valve 10 may be compressible to a compressed state for delivery, and expandable to an expanded state for implantation. The stent-valve 10 comprises a stent 20, a plurality of leaflets 14 and a structured sealing skirt 40. The stent 20 may have an axial inflow end 20a and an axial outflow end 20b. The plurality of leaflets 14 may be arranged within the stent 20. The structured sealing skirt 40 may be configured for reduction or prevention of paravalvular leakage. In the expanded state as shown, for instance in FIGS. 1 to 3b, the structured sealing skirt 40 may comprise one or more sealing formations 100, 100a, 100b. The one or more sealing formations 100 may be arranged on a radially outer surface 42 of the structured sealing skirt 40. At least in the expanded state, at least one of the one or more sealing formations 100 may be shaped and arranged such that, at each axial level of the structured sealing skirt 40 covered by the one or more sealing formations 100, the fraction of the radially outer surface 42 occupied by the one or more sealing formations 100 is less than 100%, specifically less than about 90%, more specifically less than about 80%, and in particular less than about 70%. In some embodiments, the fraction of the radially outer surface 42 occupied by the one or more sealing formations may be less than about 60%, specifically less than about 50%, more specifically less than about 40%, and in particular less than about 30%, at each axial level of the structured sealing skirt 40. In some embodiments, the fraction of the radially outer surface 42 occupied by the one or more sealing formations 100 may be between about 5% and about 95%, specifically between about 10% and about 85%, more specifically between about 15% and about 80% and in particular between about 20% and about 70%. Although mostly referred to a sealing formation 100 in the following, it should be understood that the features described in the following may also refer to the sealing formations 100a, 100b.

In some embodiments, specifically depending on the shape of the sealing formation 100, the fraction may generally be in the range of about 20% to about 70%. For instance, the fraction occupied at different axial levels by the sealing formation 100 of FIG. 2a may be less than the fraction occupied at different axial levels by the sealing formation 100a of FIG. 3a. In another example, the fraction occupied at different axial levels by the sealing formation 100 in FIG. 2b may be less than the fraction occupied at different axial levels by the sealing formation 100a of FIG. 2a. In some embodiments, the sealing formation 100 may be arranged on a radially outer surface 42 such that, at least in the expanded state, the one or more sealing formations 100 protrudes radially outward from the radially outer surface 42. In other words, the one or more sealing formations 100 may, at least in the expanded state, extend radially outward from the radially outer surface 42 of the structured sealing skirt 40. Alternatively described, the one or more sealing formations 100 may act as a structure on the radially outer surface 42 of the structured sealing skirt 40. In some embodiments, at least in the expanded state, the fraction occupied by the one or more sealing formations 100 may differ at a first axial level of the structured sealing skirt 40 from the fraction occupied by the one or more sealing formations 100 at least at a second axial level of the structured sealing skirt 40. Additionally or alternatively, the fraction occupied by the one or more sealing formations may vary at different axial levels covered by the sealing formation 100. In some embodiments, at at least one axial level, the fraction may be in the range of about 40% to about 50%. Additionally or alternatively, at at least one (e.g. other) axial level, the fraction may be in the range of about 20% to about 30%.

Figure 2A:
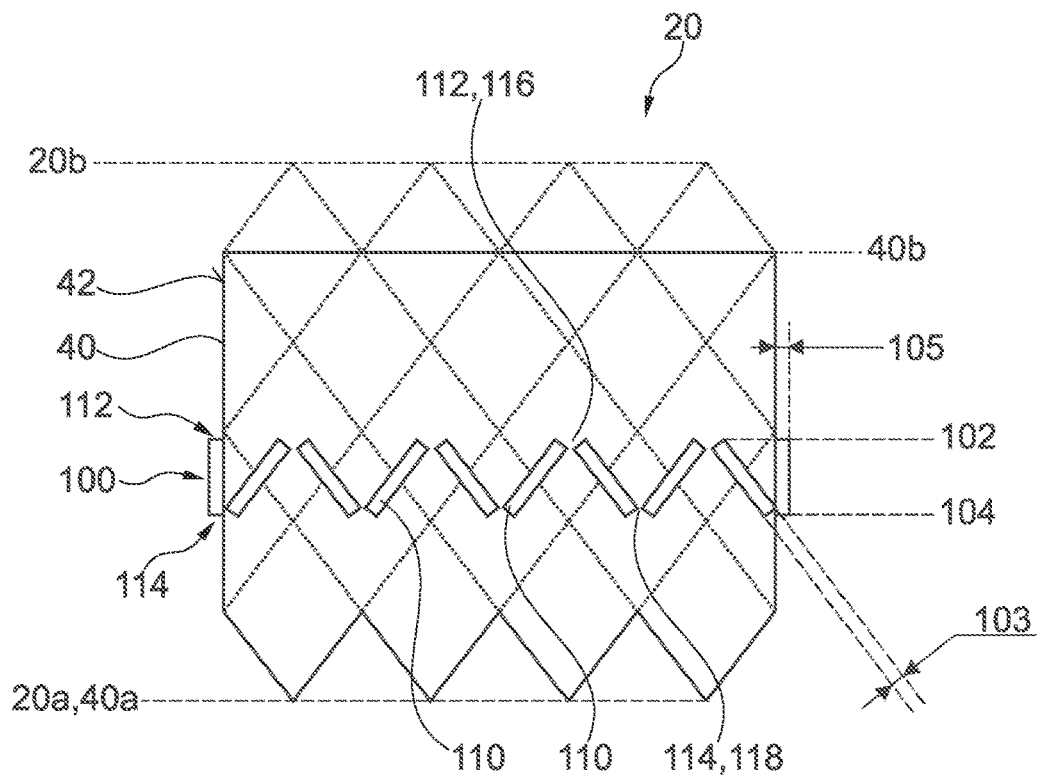
FIGS. 2a and 2b are schematic drawings illustrating a stent 20 with a structured sealing skirt 40 having a sealing formation 100 in a first and a second exemplary meandering shape, respectively.
Figure 2B:
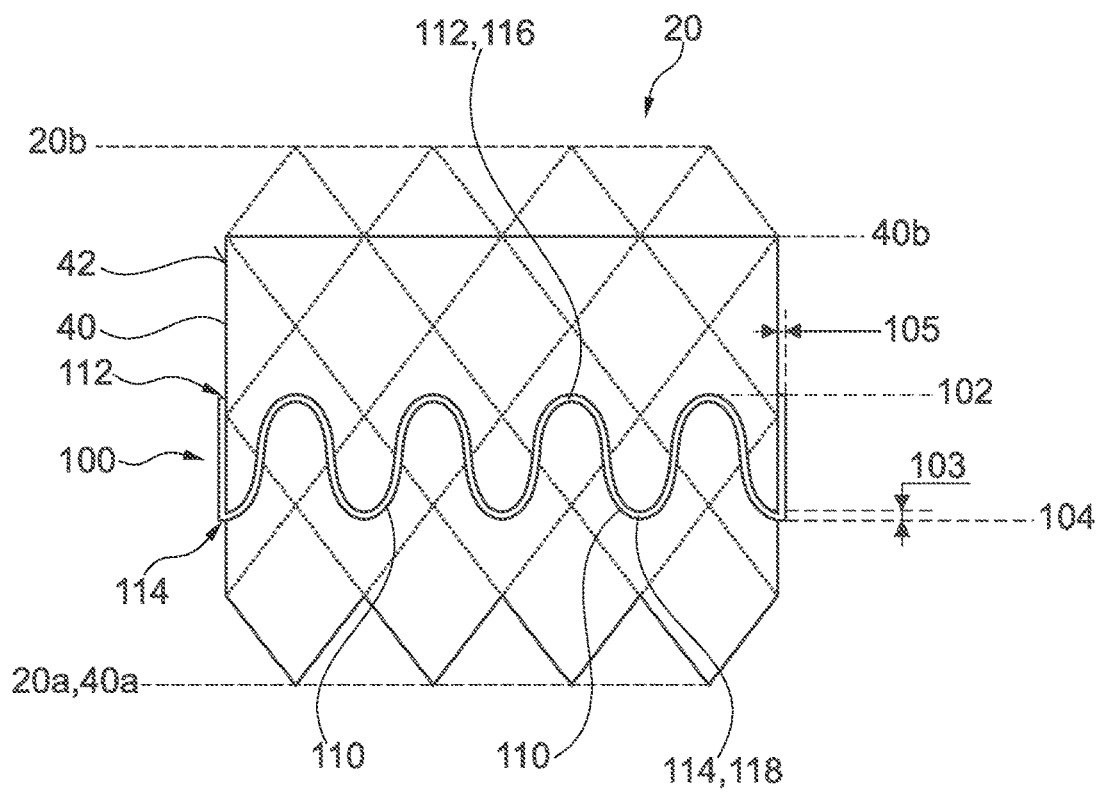
Figure 3A:
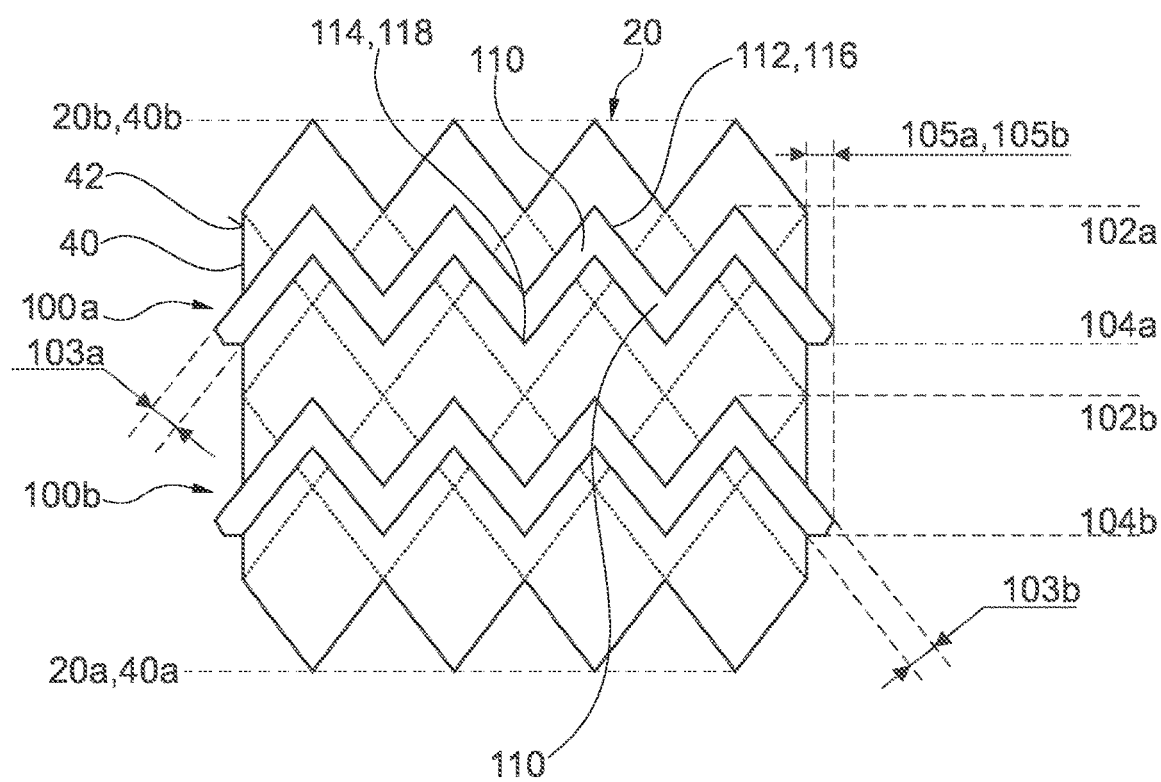
FIGS. 3a and 3b are schematic drawings illustrating a stent 20 with a structured sealing skirt 40 having two exemplary sealing formations 100.
Figure 3B:
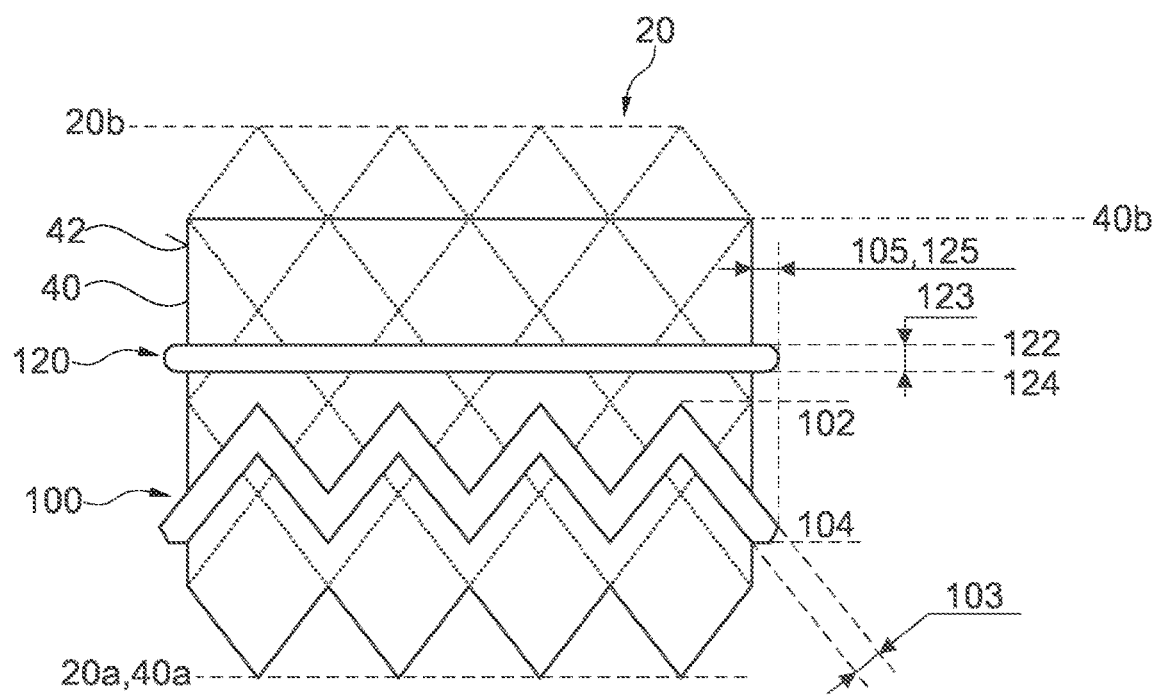

In some embodiments, at least in the expanded state, it may be advantageous that at least one of the one or more sealing formations 100 has a meandering shape extending circumferentially around the structured sealing skirt 40 (see for instance, sealing formations 100 in FIGS. 2a and 2b, sealing formations 100a, 100b in FIG. 3a or sealing formation 100b in FIG. 3b). As can be seen in the figures, the meandering shape may extend in a circumferential direction and an axial direction. The sealing formation 100 may not include a substantial step-change in an axial direction between two axial levels, but may rather meander progressively around the circumference between axial levels. More specifically, a sealing formation 100 may meander between a first axial height 102 (also: first axial level 102) and a second axial height 104 (also: second axial level 104) (see, for instance FIGS. 2a, 2b, 4a and 5a). In case of more than one sealing formation 100, each sealing formation 100, 100a, 100b may extend and/or meander between a respective first axial height 102a, 102b and a respective second axial height 104a, 104b (see, for instance FIGS. 3a). In some embodiments, the meandering shape may alternate between an upper apex 116 the first axial height 102 (or 102a or 102b) and a lower apex 118 at a second axial height 104 (or 104a or 104b) (see, for instance FIGS. 2b and 3a). The expression "apex" of the meandering shape may be, for instance, a turning point where the meandering shape changes its extension direction from "towards the axial inflow end 20a" to "towards the axial outflow end 20b" (i.e. a lower apex 118) or vice versa (i.e. an upper apex 116). Alternatively described, apexes 116, 118 may also be referred to as peaks (i.e. upper apexes 116) and valleys (i.e. lower apexes 118) of the meandering shape or of the sealing formation 100. In other words, an upper apex 116 is arranged closer to the axial outflow end 20b than a lower apex 118. The meandering shape may be formed by one or more circumferentially adjacent repeat units. A repeat unit may extend between two adjacent upper apexes 116. Alternatively described, a repeat unit may extend between two adjacent lower apexes 118. With respect to FIG. 3a, the meandering shape of an exemplary sealing formation 100a may be formed be several repeat units. In this example, the repeat units are V-shaped and each repeat unit extends between two adjacent upper apexes 116. That means a sealing formation 100 may comprise several upper and lower apexes 116, 118. In other embodiments, a sealing formation 100 may only comprise one upper apex 116 and one lower apex 118. That means, in this exemplary embodiment, the sealing formation 100 may be formed by only one repeat unit. In general, a sealing formation 100 may be formed by any number of repeat units. For instance, a number of repeat units of the meandering shape may be at least two, optionally at least three, optionally at least four, optionally at least five, optionally at least six, optionally at least seven, optionally at least eight, optionally at least nine, optionally at least ten, optionally at least eleven, optionally at least twelve, optionally at least thirteen, optionally at least fourteen. In some embodiments, a sealing formation 100 may be formed by repeat units different than V-shaped. For instance, the sealing formation may comprise one or more repeat units selected from V-shaped units pointing towards the inflow end 20a, V-shaped units pointing towards the outflow end 20b, W-shaped units pointing towards the inflow end 20a, W-shaped units pointing towards the outflow end 20b, U-shaped units pointing towards the inflow end 20a, or U-shaped units pointing towards the inflow end 20b. Also, in some embodiments, a sealing formation 100 may be formed by a combination of differently shaped repeat units. In some embodiments, a repeat unit may be represented by a portion of the sealing formation 100 extending from the first axial height 102 to second axial height 104 and back to the first axial height 102. In other words, a sealing formation 100 may be formed as a repeating pattern of several circumferentially adjacent repeat units.

The meandering shape may result in that the one or more sealing formations 100 occupy only a fraction of the radially outer surface 42 of the structured sealing skirt 40 as set out further above. Depending on the specification of the meandering shape of the sealing formation 100, the fraction may, for instance, be generally in the range of about 20% to about 70%. The provision of a sealing formation 100 in a meandering shape may reduce a concentration of material at a single axial level on the structured sealing skirt 40 (and also on the stent-valve 10), which could otherwise impact compressibility. In some embodiments, at least one of the one or more sealing formations 100 may extend circumferentially around the structured sealing skirt 40 in a wavy shape, a zigzag shape, a sinuous shape, or other meandering linear, curved or curvilinear shape. In some embodiments, at least one of the one or more sealing formations 100 may extend continuously or intermittently at least about an angle of about 180°, specifically at least about an angle of about 270°, more specifically at least about an angle of about 360° along a circumference of the radially outer surface 42 of the structured sealing skirt 40. In some embodiments, the meandering shape of at least one of the one or more sealing formations 100 may have a generally closed loop shape. A closed loop shape may be a shape of a sealing formation extending continuously (i.e. without interruptions) about an angle of about 360° along a circumference of the radially outer surface 42 of the structured sealing skirt 40, e.g. a meandering continuous shape (see, for instance sealing formations 100, 100a, 100b of FIGS. 2b to 3b). In some embodiments, the meandering shape of at least one of the one or more sealing formations 100 may have a loop shape with one or more interruptions, e.g. a meandering interrupted shape, (see, for instance FIG. 2*a*). As shown in the example of FIG. 2*a*, the interruptions may be arranged in areas where a closed loop meandering shape would have its upper and lower apexes 116, 118, i.e. at the first and second axial levels 102, 104. In other embodiments, the interruptions may be located only at some or all of the upper apexes 116 and/or at some or all of the lower apexes 118. For instance, in some embodiments, a sealing formation 100 may be formed by several repeat units, e.g. V-shaped repeat units, which are not connected to each other. In some embodiments, the interruptions may alternatively be arranged in between the first and second axial levels 102, 104. Alternatively described, the interruptions may be located in between respective adjacent upper and lower apexes 116, 118. The number of interruptions may be at least one, optionally at least two, optionally at least three, optionally at least four, optionally at least five, optionally at least six, optionally at least seven, optionally at least eight, optionally at least nine, optionally at least ten. In some embodiments, the number of interruptions may be less, specifically half the number of repeat units of a meandering shape. In some embodiments, the number of interruptions may equal the number of repeat units of a meandering shape. In some embodiments, the number of interruptions may be more, specifically double the number of repeat units of a meandering shape.

In some embodiments, in the expanded state, a thickness 103 of at least one of the one or more sealing formations 100 may vary in direction along the meandering shape. That means, the thickness 103 of a sealing formation 100 may vary between a lower and an upper thickness 103 at different locations. In some embodiments, the one or more sealing formations 100 may have a generally uniform thickness 103 around the circumference of the skirt 40 (see, for instance FIG. 2*b*). Additionally or alternatively, a height 105 of at least one of the one or more sealing formations 100 may vary in direction along the meandering shape. That means, the height 105 of a sealing formation 100 may vary between a lower and an upper height 105 at different locations. In some embodiments, the one or more sealing formations 100 may have a generally uniform height 105 around the circumference of the skirt 40 (see, for instance FIGS. 2*a* to 3*b*). In some embodiments, in the expanded state, the one or more sealing formations 100 may project radially outward from the radially outer surface 42 of the structured sealing skirt 40 to a height 105 of no more than about 5 mm, more specifically no more than about 4 mm, and in particular no more than about 3 mm. This feature may advantageously provide a low profile in compressed state while still adequately sealing paravalvular leaks. The expression "thickness 103" can be understood as a dimension of the sealing formation 100 measured in a direction generally perpendicular to the radial direction on the radially outer surface 42. Specifically, the thickness 103 can be understood a dimension perpendicular to an extension direction of the meandering shape, i.e. a dimension perpendicular to a middle line or base line in the sealing formation 100 extending in the meandering shape. The expression "thickness 105" can be understood as a dimension of the sealing formation 100 measured in a generally radial direction. Specifically, the height 105 can be understood as a dimension of the sealing formation 100 measured in a generally radially outward direction from the radially outer surface 42.

In some embodiments, in the expanded state, the upper apexes 116 (i.e. the peaks) and the lower apexes 118 (i.e. the valleys) may be at least partly filled with sealing material (see for instance FIGS. 5*a* to 5*d*). In other embodiments, in the expanded state, only some or all of the upper apexes 116 and/or only some or all of the lower apexes 118 may be at least partly filled with sealing material.

In general, the fraction occupied by the one or more sealing formations (100) may depend on one or more of:
(a) the thickness 103 of the one or more sealing formations 100 measured in a direction perpendicular to the radial direction;
(b) an overall axial height or axial extent of the one or more sealing formations 100, e.g. the axial distance between an upper axial level 102 and a lower axial level 104 of a respective sealing formation 100; and/or
(c) a circumferential distance between two similar height positions in the meandering shape, e.g. the circumferential extension of a repeat unit and/or the number of repeat units.

In some embodiments, the stent 20 may comprise a lattice structure of cells defined by interconnected struts defining a repeating pattern along the circumference (see, dotted lines in FIGS. 2*a* to 3*b* schematically illustrating the lattice structure). The entire meandering shape of the one or more sealing formations 100 does not follow the underlying struts (see, for instance sealing formations 100*a*, 100*b* of FIGS. 3*a*, 4*a*, 7*a*, 8*a*). In other embodiments, only a portion of the meandering shape may not follow the underlying struts. The expression "following the underlying struts" can be understood as being aligned or oriented to the underlying struts (at the same axial and/or circumferential position). In other words "not following the underlying struts" can be understood that a shape is not aligned or oriented to the underlying struts. However, a shape, e.g. the meandering shape may cross the underlying struts. In some embodiments, the meandering shape of the one or more sealing formations 100 may have a circumferential repeat distance or "period" that equals about a cell width of the lattice structure. In that case, the sealing formation 100, 100*a*, 100*b*, i.e. its meandering shape may be shaped similar as the zigzag shape of the underlying stent struts (see, for instance sealing formations 100*a*, 100*b* of FIGS. 3*a*, 4*a*, 7*a*, 8*a*). In other embodiments, for example those shown in FIG. 6 or 5*a*, the meandering shape of the one or more sealing formations 100 may have a circumferential repeat distance or "period", i.e. a circumferential extension of a repeat unit, that is longer than a cell width of the lattice structure. In that case, the sealing formation 100 (or its meandering shape) may not be shaped as the zigzag shape of the underlying stent struts. In other embodiments, the meandering shape of the one or more sealing formations 100 may have a circumferential repeat distance or "period", i.e. a circumferential extension of a repeat unit, that is shorter than a cell width of the lattice structure. In other words, the meandering shape may comprise repeat units which have the same, a smaller or a larger dimension than the cell width of the lattice structure of the stent. In some embodiments, it may advantageous that the meandering shape is dimensioned similar to the zig-zag shape defined by the struts, i.e. wherein the circumferential distance between two adjacent upper apexes 116 or two adjacent lower apexes 118 equals about the width of a cell, both measured in a circumferential direction. In some embodiments, it may be particularly useful that the one or more sealing formations 100, i.e. their meandering shapes are axially offset to the underlying struts. In other words, the meandering shape may be slightly axially offset from the struts and/or from an adjacent edge of the structured sealing skirt 40, to provide space to attach, specifically to suture, the structured sealing skirt 40 to the underlying struts and to avoid a concentration of material at a single axial level on the structured sealing skirt 40. More specifically, the upper apexes 116 and/or the lower apexes 118 of the meandering shape, i.e. of the one or more sealing formations 100, may be arranged at a position overlapping with an underlying cell, e.g. with an interior of an underlying cell. In some embodiments, the upper apexes 116 and/or the lower apexes 118 of the meandering shape, i.e. of the one or more sealing formations 100, may be arranged at a position centrally overlapping with an underlying cell. That means, the upper apexes 116 and/or the lower apexes 118 of the meandering shape, i.e. of the one or more sealing formations 100, may be arranged centrally on a cell, e.g. radially outside of a cell but in a surface area of the radially outer surface 42 confined by a cell. Thereby, the upper apexes 116 and the lower apexes 118 may be arranged such that they do not overlap with the underlying struts of the stent 20 (see, for instance, sealing formations 100, 100a, 100b of FIGS. 2b and 3a). In other words, the stent 20 may comprise a lattice structure of diamond-shaped cells having axial apexes and wherein the upper apexes 116 and the lower apexes 118 of the meandering shape are axially offset to the axial apexes of the diamond-shaped cells (see, for instance FIG. 3a). For instance, when considering one example diamond-shaped cell, the diamond-shaped cell may be confined by struts defining two axial apexes (one towards the axial inflow end 20a and one towards the axial outflow end 20b) and two circumferential apexes to the lateral sides. The axial apexes may also be denoted as longitudinal apexes. The circumferential apexes may also be denoted lateral apexes. The sealing formation 100, 100a, 100b (i.e. its meandering shape) may be arranged and adapted such that, at least in the expanded state, an example apex 116, 118 is axially offset from the axial apexes of the diamond-shaped cells and circumferentially offset from the lateral apexes of the diamond-shaped cell. In some embodiments, only one, some or all apexes 116, 118 of the meandering shape may be offset from the apexes of the diamond-shaped cells of the stent 20. Thereby, a concentration of material at a single axial level on the structured sealing skirt 40, particularly in a compressed state, may be avoided or reduced. Additionally or alternatively, the apexes 116, 118 of the meandering shape, i.e. of the one or more sealing formations 100, may be at least partly compressed or pushed into the cells, e.g. a respective interior of a cell.

In some embodiments, at least one of the one or more sealing formations 100 may extend over at least about 50% of an axial height of the structured sealing skirt 40, optionally at least about 60%, optionally at least about 70%, optionally at least about 80%. In some embodiments, the one of the one or more sealing formations 100 may cover in combination at least about 50% of an axial height of the structured sealing skirt 40, optionally at least about 60%, optionally at least about 70%, optionally at least about 80%. In some embodiments, at least one of the of one or more sealing formations 100 may cover at most about 10% of an axial height of the structured sealing skirt 40, optionally at most about 15%, optionally at most about 20%, optionally at most about 25% or optionally at most about 30%. Each sealing formation 100 may extend between a respective first axial height 102 and a respective second axial height 104. The first and second axial heights 102, 104 may be different for each sealing formation 100. It can be appreciated that the meandering continuous shape of a sealing formation 100 can still provide a continuous sealing barrier to obstruct blood leakage, but using with less material compared to a fully occupied cuff of seal material of the same height, thereby leading to easier compressibility. In this regard, FIG. 3b (and also FIGS. 9a to 9c) shows an exemplary embodiment of a structured sealing skirt 40 which may comprise a sealing formation 100 with a meandering shape wherein only a fraction of the radially outer surface 42 is occupied at each axial level of the structured sealing skirt 40 between the first axial height 102 and the second axial height 104. In addition to the sealing formation 100, the structured sealing skirt 40 may comprise a fully occupied sealing portion 120 between the axial heights 122 and 124. The fully occupied sealing portion 120 and the sealing formation 100 may comprise about the same thickness 103, 123 and/or about the same height 105, 125, whereas the sealing formation 100 may cover a larger axial height of the structured sealing skirt 40 whilst also leading to easier compressibility.

In some embodiments, the structured sealing skirt 40 may have a first sealing skirt end 40a arranged towards the axial inflow end 20a and a second sealing skirt end 40b arranged towards the axial outflow end 20b (see, for instance FIG. 1). Additionally, at least in the expanded state, at least one of the one or more sealing formations 100 may be positioned towards the first sealing skirt end 40a (see, for instance sealing formation 100b in FIG. 3a). In some embodiments, at least one of the one or more sealing formations 100 may be positioned axially adjacent to the first sealing skirt end 40a (see, for instance sealing formation 100 in FIG. 4a). In other embodiments, at least one of the one or more sealing formations 100 may be positioned at the first sealing skirt end 40a. In some embodiments, at least in the expanded state, at least one of the one or more sealing formations 100 may be positioned axially adjacent the second sealing skirt end 40b (see, for instance sealing formation 100a in FIG. 3a). In other embodiments, at least one of the one or more sealing formations 100 may be positioned at the second sealing skirt end 40b. In other embodiments the position of the sealing formation 100 may be different. For example, the sealing formation 100 may be placed axially further from the inflow extremity than in the previously illustrated embodiments, such that the sealing formation 100 is spaced axially from the inflow extremity. In some embodiments, the one or more sealing formations 100 may comprise a first sealing formation 100a and a second sealing formation 100b (see, FIGS. 3a and 7a to 8c). It can be understood that the first and second sealing formations 100a, 100b may comprise any one of the features as generally described with respect to the sealing formation 100 above. At least in the expanded state, the first sealing formation 100a and the second sealing formation 100b may be axially offset from each other. In some embodiments, the first sealing formation 100a and the second sealing formation 100b may be axially spaced from each other. The expression "axially offset" can be understood as axially not contacting but can mean partly overlapping circumferentially. The expression "axially spaced" can be understood as not overlapping circumferentially. In that meaning, the sealing formations 100a, 100b of the FIGS. 3a and 7a to 8c may be axially spaced. In other embodiments sealing formations may be axially offset, i.e. they may at least partly overlap circumferentially. In some embodiments, the second sealing formation 100b may generally have the same shape as the first sealing formation 100a. In other embodiments, the first sealing formation 100a and the second sealing formation 100b may have different shapes. For instance the first sealing formation 100a and the second sealing formation 100b may have a different number of repeat units, different thicknesses 103, different heights 105 and/or different meandering shapes (e.g. one curved and one V-shaped). In some embodiments, the second sealing formation 100b may be arranged in register with shape features of the first sealing formation 100a (see, for instance FIGS. 3a and 7a). In some embodiments, the second sealing formation 100b may be arranged not in register with shape features of the first sealing formation 100a (see, for instance FIG. 8a). The expression "in register" means that respective upper and lower apexes 116 or 116a or 116b), 118 (or 118a or 118b) are arranged at about the same circumferential positions. "Not in register" means that at least some or all of respective upper and lower apexes 116 (or 116a or 116b), 118 (or 118a or 118b) are not arranged at about the same circumferential positions. In some embodiments, the structured sealing skirt 40 may comprise more than two, for instance three sealing formations, optionally four sealing formations, optionally five sealing formations or more than five sealing formations which may be comprise any one of the features as explained above with respect to the sealing formations 100, 100a, 100b.

In some embodiments, in the expanded state, the one or more sealing formations (100) may project radially outward from the surface of the structured sealing skirt (40) to a height (105) of no more than about 5 mm, more specifically no more than about 4 mm, and in particular no more than about 3 mm.

In some embodiments, the one or more sealing formations 100 may comprise material that is configured to expand or swell in response to contact with liquids. In some embodiments, it may be advantageous that the one or more sealing formations 100 comprise material that is configured to expand or swell in response to contact with blood. In some embodiments, the one or more sealing formations 100 may comprise fibrous material. In some embodiments, it may be particularly useful, that the one or more sealing formations 100 are formed of fibrous material. In some embodiments, the one or more sealing formations 100 may comprise material chosen from open or closed cell porous material, specifically an open cell porous material, and in particular an open cell porous material configured to facilitate endothelialization of the one or more sealing formations 100. In some embodiments, the one or more sealing formations 100 may have a void content of more than about 30%, more specifically more than about 40% and in particular more than about 50%. This feature may allow a good compression of the stent valve 10, in particular a good compression of the structured sealing skirt 40 and the one or more sealing formations 100, in the compressed state. Furthermore, the one or more sealing formations 100 may be configured such that the voids may be closable by endothelialization and/or such that the voids may be fillable with blood.

In some embodiments, the one or more sealing formations 100 may be attached to or integrally formed with the structured sealing skirt 40.

In some embodiments, the one or more sealing formations 100 may be made of any suitable biocompatible material, for example, biological tissue (for example, pericardial tissue such as porcine or bovine pericardial tissue), metal (e.g. a metal foil), or a synthetic material. In some embodiments, the synthetic material may, for example, comprise one or more of PET, PEEK and polyurethane. The synthetic material may, for example, be a fabric, such as a woven, non-woven, or knitted fabric. In some embodiments, the synthetic material may, for example, comprise a material capable expanding in situ and/or being compressible to facilitate crimping. An expandable material may include a swellable material such as a hydrogel. A compressible and/or expandable material may also include a fibrous material (e.g. a porous fibrous material), foam or sponge. Such a material may self-expand resiliently when the stent 20 deploys. Additionally or alternatively, such a material may absorb blood (and/or a blood component) within its pores or interstices in order to expand the material physically or add bulk. In the case of a porous material, blood penetrating the material may become trapped in the pores or interstices to provide a barrier to blood flow through the material.

In some embodiments, the structured sealing skirt 40 may be formed of material selected from: biologic materials, polymeric materials, fabric materials, permeable materials, impermeable materials, materials that promote tissue ingrowth, materials that retard tissue ingrowth, foam materials, sealing materials, and combinations thereof. In some embodiments, the structured sealing skirt 40 may be formed of material selected from: biological tissue, for instance pericardial tissue, metal, for instance metal foil, synthetic material and combinations thereof. The synthetic material may be selected from: fabric; hydrogel; foam; sponge; porous fibrous material.

In some embodiments, the one or more sealing formations 100 may be formed of the same or of a different material than the structured sealing skirt 40.

In some embodiments, the structured sealing skirt 40 may be arranged on the exterior of the stent 20. In some embodiments, the structured sealing skirt 40 may be arranged radially outside of the stent 20. In some embodiments, the structured sealing skirt 40 may be attached to the stent 20. In some embodiments, the structured sealing skirt 40 may be attached to the stent 20 on an exterior of the stent 20. In some embodiments, only a portion of the structured sealing skirt 40 may be attached to the stent 20 on an exterior of the stent 20. In some embodiments, the structured sealing skirt 40 may be attached to stent 20 on an interior of the stent 20. In some embodiments, only a portion of the structured sealing skirt 40 may be attached to the stent on an interior of the stent. In some embodiments, the structured sealing skirt 40 may be attached to stent 20 on an interior and on an exterior of the stent 20. In some embodiments, the structured sealing skirt 40 may be an outer skirt. In some embodiments, the structured sealing skirt 40 may be an everted portion of an inner skirt 30. In some embodiments, the structured sealing skirt 40 may be an outer skirt and may form a pocket with an inner skirt 30.

In some embodiments, the stent 20 may comprise at least one of: a lower tubular portion 26, an upper crown portion 28, a plurality of upstanding commissural supports 21, and/or a plurality of stabilization arches 22. In some embodiments, the stent 20 may comprise the lower tubular portion 26. In some embodiments, the stent 20 may comprise the lower tubular portion 26, the upper crown portion 28, a plurality of upstanding commissural supports 21, and the plurality of stabilization arches 22. In some embodiments, the lower tubular portion 26 may communicate with the upper crown 28 and the commissural supports 21.

Alternatively or additionally, the commissural supports 21 may upstand relative to the upper crown portion 28. Alternatively or additionally, the stabilization arches 22 may communicate with the commissural supports 21. In some embodiments, specifically at least in the expanded state, the one or more sealing formations 100 may be positioned between and spaced from respective extremities of both a free edge of the upper crown portion 28, and a free edge of the lower tubular portion 26. In some embodiments, specifically at least in the expanded state, at least one of the one or more sealing formations 100 may be arranged at an axial height of the lower tubular portion 26. Alternatively or additionally, at least one of the one or more sealing formations 100 may be arranged at an axial height of an extremity of the lower tubular portion 26 the furthest away from the axial inflow end 20a. In some embodiments, the stent 20 may comprise an extremity formed with a substantially zig-zag shape at the axial inflow end 20a. Additionally, an edge of the structured sealing skirt 40 at a first sealing skirt end 40a has a zig-zag shape that matches substantially the zig-zag shape of the stent 20.

In some embodiments, at least one of the one or more sealing formations 100 may not extend in a straight circumferential direction. In some embodiments, at least one of the one or more sealing formations 100 may have meandering shape, in particular a closed loop meandering shape, as explained above. Additionally, at least in the expanded state, the at least one of the one or more sealing formations 100 may extend less than about 50%, optionally less than about 40%, optionally less than about 30%, specifically less than about 20% and more specifically less than about 10% of the whole outer circumference of the structured sealing skirt 40 in a straight circumferential direction. In some embodiments, each of the one or more sealing formations 100 does not extend in a straight circumferential direction. In some embodiments, the expression "along a circumference" may not necessarily mean in a circumferential direction but only that a sector of about 180°, about 270°, or about 360° on the circumference of the radially outer surface 42 may be covered by the one or more sealing formations 100. In some embodiments, the expression "circumferential direction" can be understood as a "straight" circumferential direction, i.e. circumferentially around an axis of the stent 20 or an axis of the structured sealing skirt 40.

In some embodiments, at least in the expanded state, at least one of the one or more sealing formations 100 may comprise a plurality of circumferentially distributed sub-portions 110 (see, for instance FIGS. 2a to 3a). Each of the plurality of circumferentially distributed sub-portions 110 may have a lengthy shape and may extend from a first end 112 at a first axial height 102 to a second end 114 at a second axial height 104. The expression "lengthy shape" can be understood as shape seen two-dimensionally, wherein a ratio of a first dimension defining a longitudinal axis of the sub-portion and a second dimension defining a perpendicular axis of the sub-portion, is at least about 1.5, optionally at least about 2.0, optionally at least about 2.5, optionally at least about 3.0. At least in the expanded state, the sub-portions 110 may be shaped and arranged such that, going from one sub-portion 110 to a circumferentially adjacent sub-portion 110 in a circumferential direction, the respective first ends 112 of two adjacent sub-portions 110 are alternatingly closer together and further away in a circumferential direction than their second ends 114. For instance, the respective first ends 112 of the sub-portions referenced with "110" in FIG. 3a are closer together than their respective second ends 114. However, comparing the sub-portion 110 being referenced on the right side in FIG. 3a with a (not referenced) sub-portion 110 being circumferentially adjacent to the right side, it can be seen, that their respective first ends 112 are further distanced from each other than their respective second ends 114. In some embodiments, two adjacent sub-portions 110 may be connected, in particular directly connected to each other, only at those ends 112, 114 which are closer together than the respective other ends 112, 114 (see, for instance FIGS. 2b and 3a). In other words, two adjacent sub-portions 110 may not be connected to each other, at those ends 112, 114 which are farther away from each other than the respective other ends 112, 114. In some embodiments, the sub-portions 110 may not be connected to each other at all, i.e. intermittent meandering shape of sealing formation 100 (see, for instance FIG. 2a). In some embodiments, the plurality of sub-portions 110 may be configured and arranged, such that, during a transition from a compressed state to an expanded state, the first ends 112 and/or the second ends 114 of two adjacent sub-portions 110 are moved away from each other circumferentially. In other words, in particular those ends 112, 114 which are farther away from each other may move closer together, during a transition from the expanded to the compressed state, such that the sub-portions 110 may be oriented from an inclined direction with respect to the axial direction in the expanded state further towards a direction parallel with the axial direction in the compressed state.

REFERENCE SIGN LIST 10 stent-valve
14 leaflets
14a valve inflow end
14b valve outflow end
16 native leaflet portion
18 native valve annulus portion
20 stent portion
20a axial inflow end
20b axial outflow end
21 commissural supports
22 stabilization arches
26 lower tubular portion
26a lower stent apexes
26b upper stent apexes
28 upper crown portion
30 inner skirt
40 structured sealing skirt
40a first sealing skirt end
40b second sealing skirt end
42 radially outer mandrel surface
100, 100a, 100b sealing formation
102, 102a, 102b first axial height
103, 103a, 103b thickness
104, 104a, 104b second axial height
105, 105a, 105b height
110 sub-portion
112 first end
114 second end
116 upper apex
118 lower apex
120 fully occupied sealing
122 first axial height
123 thickness
124 second axial height
125 height It should be understood that the present invention can also (alternatively) be defined in accordance with the following configurations:

1. A cardiac stent-valve (10) for transcatheter delivery, the stent-valve (10) being compressible to a compressed state for delivery, and expandable to an expanded state for implantation, the stent-valve (10) comprising:
   a stent (20) with an axial inflow end (20a) and an axial outflow end (20b),
   a plurality of leaflets (14) arranged within the stent (20), and
   a structured sealing skirt (40) for reduction or prevention of paravalvular leakage;
   wherein the structured sealing skirt (40) comprises one or more sealing formations (100) being arranged on a radially outer surface (42) of the structured sealing skirt (40),
   wherein, at least in the expanded state, at least one of the one or more sealing formations (100) is shaped and arranged such that at each axial level of the structured sealing skirt (40) covered by the one or more sealing formations (100), the fraction of the radially outer surface (42) occupied by the one or more sealing formations (100) is less than 100%, specifically less than about 90%, more specifically less than about 80%, and in particular less than about 70%.

2. The cardiac stent-valve (10) of configuration 1, wherein, at least in the expanded state, the fraction occupied by the one or more sealing formations (100) differs at a first axial level of the structured sealing skirt (40) from the fraction occupied by the one or more sealing formations (100) at least at a second axial level of the structured sealing skirt (40).

3. The cardiac stent-valve (10) of any one of the preceding configurations, wherein, at least in the expanded state, at least one of the one or more sealing formations (100) has a meandering shape extending circumferentially around the structured sealing skirt (40).

4. The cardiac stent-valve (10) of configuration 3, wherein, the meandering shape alternates between an upper apex (116) at a first axial height (102) and a lower apex (118) at a second axial height (104).

5. The cardiac stent-valve (10) of configuration 4, wherein the meandering shape is formed by one or more circumferentially adjacent repeat units, wherein each repeat unit extends between two adjacent upper apexes (116) and/or two lower apexes (118).

6. The cardiac stent-valve (10) of configuration 5, wherein a number of repeat units of the meandering shape extending circumferentially around the structured sealing skirt (40) is at least two, optionally at least three, optionally at least four, optionally at least five, optionally at least six, optionally at least seven, optionally at least eight, optionally at least nine, optionally at least ten.

7. The cardiac stent-valve (10) of any one of configurations 5 or 6, wherein the repeat units comprise one or more repeat units selected from V-shaped units pointing towards the inflow end (20a), V-shaped units pointing towards the outflow end (20b), W-shaped units pointing towards the inflow end (20a), W-shaped units pointing towards the outflow end (20b), U-shaped units pointing towards the inflow end (20a), or U-shaped units pointing towards the inflow end (20b).

8. The cardiac stent-valve (10) of any one of configurations 3 to 7, wherein the stent (20) comprises a lattice structure of cells defined by interconnected struts defining a repeating pattern along the circumference, and wherein at least a portion of the meandering shape does not follow the underlying struts.

9. The cardiac stent-valve (10) of any one of configurations 3 to 8, wherein the stent (20) comprises a lattice structure of diamond-shaped cells having axial apexes and wherein one or more of the upper apexes (116) and/or the lower apexes (118) of the meandering shape is axially offset to the axial apexes of the diamond-shaped cells.

10. The cardiac stent-valve (10) of any one of configurations 8 or 9, wherein the upper apexes (116) and/or the lower apexes (118) are arranged at a position overlapping with the interior of an underlying cell, and optionally, wherein the upper apexes (116) and/or the lower apexes (118) are arranged such that the upper apexes (116) and/or the lower apexes (118) do not overlap with the underlying struts of the stent (20).

11. The cardiac stent-valve (10) of any one of configurations 3 to 10, wherein at least one of the one or more sealing formations (100) extends circumferentially around the structured sealing skirt (40) in a wavy shape, a zigzag shape, a sinuous shape, or other meandering linear, curved or curvilinear shape.

12. The cardiac stent-valve (10) of any one of configurations 3 to 11, wherein at least one of the one or more sealing formations (100) extends continuously or intermittently at least about an angle of about 180°, specifically at least about an angle of about 270°, more specifically at least about an angle of about 360° along a circumference of the radially outer surface (42).

13. The cardiac stent-valve (10) of any one of the preceding configurations, wherein at least one of the one or more sealing formations (100) has a generally closed loop shape or a loop shape with one or more interruptions.

14. The cardiac stent-valve (10) of any one of the preceding configurations, wherein at least one of the one or more sealing formations (100) extends over at least about 50% of an axial height of the structured sealing skirt (40), specifically at least about 60%, more specifically at least about 70%, and in particular at least about 80%.

15. The cardiac stent-valve (10) of any one of configurations 1 to 13, wherein the one of the one or more sealing formations (100) cover in combination at least about 50% of an axial height of the structured sealing skirt (40), specifically at least about 60%, more specifically at least about 70%, and in particular at least about 80%.

16. The cardiac stent-valve (10) of configuration 15, wherein at least one of the of one or more sealing formations (100) covers at most about 10% of an axial height of the structured sealing skirt (40), specifically at most about 15%, more specifically at most about 20%, and in particular at most about 25% or at most about 30%.

17. The cardiac stent-valve (10) of any one of the preceding configurations, wherein the structured sealing skirt (40) has a first sealing skirt end (40a) arranged towards the axial inflow end (20a) and a second sealing skirt end (40b) arranged towards the axial outflow end (20b) and wherein, at least in the expanded state, at least one of the one or more sealing formations (100) is positioned towards the first sealing skirt end (40a), optionally, at or axially adjacent to the first sealing skirt end (40a).

18. The cardiac stent-valve (10) of any one of the preceding configurations, wherein the structured sealing skirt (40) has a first sealing skirt end (40a) arranged towards the axial inflow end (20a) and a second sealing skirt end (40b) arranged towards the axial outflow end (20b) and wherein, at least in the expanded state, at least one of the one or more sealing formations (100) is positioned towards the second sealing skirt end (40b), optionally, at or axially adjacent to the second sealing skirt end (40b).

19. The cardiac stent-valve (10) of any one of the preceding configurations wherein, in addition to the features of configuration 3, the stent valve (10) has, in the expanded state, a thickness (103) and/or a height (105) of at least one of the one or more sealing formations (100) varies in direction along the meandering shape.

20. The cardiac stent-valve (10) of any one of the preceding configurations, in addition to the features of configuration 4, in the expanded state, the upper apexes (116) and/or the lower apexes (118) are at least partly filled with sealing material.

21. The cardiac stent-valve (10) of any one of the preceding configurations, wherein the one or more sealing formations (100) comprise a first sealing formation (100a) and a second sealing formation (100b) which are, at least in the expanded state, axially offset and/or axially spaced from each other.

22. The cardiac stent-valve (10) of configuration 21, wherein the second sealing formation (100b) has generally the same shape as the first sealing formation (100a), optionally in register with shape features of the first sealing formation (100*a*), or optionally not in register.

23. The cardiac stent-valve (10) of any one of the preceding configurations, wherein, in the expanded state, the one or more sealing formations (100) project radially outward from the radially outer surface (42) of the structured sealing skirt (40) to a height (105) of no more than about 5 mm, more specifically no more than about 4 mm, and in particular no more than about 3 mm.

24. The cardiac stent-valve (10) of any one of the preceding configurations, wherein the one or more sealing formations (100) comprises material that is configured to expand or swell in response to contact with liquids, in particular to expand or swell in response to contact with blood.

25. The cardiac stent-valve (10) of any one of the preceding configurations, wherein the one or more sealing formations (100) comprises fibrous material, in particular, wherein the one or more sealing formations (100) are formed of fibrous material.

26. The cardiac stent-valve (10) of any one of the preceding configurations, wherein the one or more sealing formations (100) comprises material chosen from open or closed cell porous material, specifically an open cell porous material, and in particular an open cell porous material configured to facilitate endothelialization of the one or more sealing formations (100).

27. The cardiac stent-valve (10) of any one of configurations 24 to 26, wherein one or more sealing formations (100) have a void content of more than about 30%, more specifically more than about 40% and in particular more than about 50%.

28. The cardiac stent-valve (10) of any one of the preceding configurations, wherein the one or more sealing formations (100) are attached to or integrally formed with the structured sealing skirt (40).

29. The cardiac stent-valve (10) of any one of the preceding configurations, the one or more sealing formations (100) are made of any suitable biocompatible material, for example, biological tissue (for example, pericardial tissue such as porcine or bovine pericardial tissue), metal (e.g. a metal foil), or a synthetic material.

30. The cardiac stent-valve (10) of any one of the preceding configurations, wherein structured sealing skirt (40) is formed of material selected from: biologic materials, polymeric materials, fabric materials, permeable materials, impermeable materials, materials that promote tissue ingrowth, foam materials, sealing materials, and combinations thereof.

31. The cardiac stent-valve (10) of any one of the preceding configurations, wherein the structured sealing skirt (40) is formed of material selected from: biological tissue, for instance pericardial tissue, metal, for instance metal foil, synthetic material and combinations thereof.

32. The cardiac stent-valve (10) of any one of configurations 30 or 31, wherein the synthetic material is selected from: fabric; hydrogel; foam; sponge; porous fibrous material.

33. The cardiac stent-valve (10) of any one of the preceding configurations, wherein the one or more sealing formations (100) are formed of the same or of a different material than the structured sealing skirt (40).

34. The cardiac stent-valve (10) of any one of the preceding configurations, wherein the structured sealing skirt (40) is arranged on the exterior of the stent (20) and/or radially outside the stent (20).

35. The cardiac stent-valve (10) of any one of the preceding configurations, wherein the stent (20) comprises at least one of: a lower tubular portion (26), an upper crown portion (28), a plurality of upstanding commissural supports (21), and/or a plurality of stabilization arches (22).

36. The cardiac stent-valve (10) of configuration 35, wherein the stent (20) comprises the lower tubular portion (26).

37. The cardiac stent-valve (10) of configuration 35, wherein the stent (20) comprises the lower tubular portion (26), the upper crown portion (28), a plurality of upstanding commissural supports (21), and the plurality of stabilization arches (22).

38. The cardiac stent-valve (10) of configuration 37, wherein the lower tubular portion (26) communicates with the upper crown (28) and the commissural supports (21), wherein the commissural supports (21) upstand relative to the upper crown portion (28), and wherein the stabilization arches (22) communicate with the commissural supports (21).

39. The cardiac stent-valve (10) of any one of the preceding configurations, wherein the stent (20) comprises an extremity formed with a substantially zig-zag shape at the axial inflow end (20*a*), and wherein an edge of the structured sealing skirt (40) at a first sealing skirt end (40*a*) has a zig-zag shape that matches substantially the zig-zag shape of the stent (20).

40. The cardiac stent-valve (10) of any one of the preceding configurations, wherein at least one of the one or more sealing formations (100) does not extend in a straight circumferential direction.

41. The cardiac stent-valve (10) of any one of the preceding configurations, wherein, at least in the expanded state, at least one of the one or more sealing formations (100) comprises a plurality of circumferentially distributed sub-portions (110), and wherein each of the plurality of circumferentially distributed sub-portions (110) has a lengthy shape and extends from a first end (112) at a first axial height (102) to a second end (114) at a second axial height (104).

42. The cardiac stent-valve (10) of configuration 41, wherein, at least in the expanded state, two adjacent sub-portions (110) are shaped and arranged such that their first ends (112) are closer in a circumferential direction than their second ends (114) or vice versa.

43. The cardiac stent-valve (10) of configuration 42, wherein two adjacent sub-portions (110) are (only) connected, in particular directly connected to each other, at those ends (112, 114) which are closer together than the respective other ends (112, 114).

44. The cardiac stent-valve (10) of any one of configurations 42 or 43, wherein two adjacent sub-portions (110) are not connected to each other at those ends (112, 114) which are further distanced than the respective other ends (112, 114).

45. The cardiac stent-valve (10) of any one of configurations 41 to 44, wherein, at least in the expanded state, the plurality of sub-portions (110) is configured and arranged, such that, during a transition from a compressed state to an expanded state, the first ends (112) and/or the second ends (114) of two adjacent sub-portions (110) are moved away from each other circumferentially.

Although specific embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

The invention claimed is:

1. A cardiac stent-valve for transcatheter delivery, the stent-valve being compressible to a compressed state for delivery, and expandable to an expanded state for implantation, the stent-valve comprising:

a stent with an axial inflow end and an axial outflow end,
a plurality of leaflets arranged within the stent, and
a structured sealing skirt for reduction or prevention of paravalvular leakage;
wherein the structured sealing skirt comprises a first sealing formation and a second sealing formation, wherein the first sealing formation has a different shape than the second sealing formation, the first and second sealing formations being arranged on a radially outer surface of the structured sealing skirt, the first sealing formation comprising U-shaped repeating units;
wherein, at least in the expanded state, the first and second sealing formations are shaped and arranged such that, at each axial level of the structured sealing skirt covered by first and second sealing formations, the fraction of the radially outer surface occupied by the first and second sealing formations is less than 100%;
wherein the structured sealing skirt comprises a first sealing skirt end arranged towards the axial inflow end and a second sealing skirt end arranged towards the axial outflow end, wherein the first sealing formation is disposed adjacent to the first sealing skirt end and the first sealing formation follows a non-linear shape of the first sealing skirt end.

2. The cardiac stent-valve of claim 1, wherein the U-shaped repeating units alternate between an upper apex at a first axial height and a lower apex at a second axial height.

3. The cardiac stent-valve of claim 2, wherein each repeating unit extends between two adjacent upper apexes and/or two lower apexes.

4. The cardiac stent-valve of claim 2, wherein the stent comprises a lattice structure of diamond-shaped cells having axial apexes and wherein one or more of the upper apexes and/or the lower apexes of the U-shaped repeating units are axially offset to the axial apexes of the diamond-shaped cells.

5. The cardiac stent-valve of claim 1, wherein at least one of the first and second sealing formations extends continuously or intermittently at an angle of at least 180° along a circumference of the radially outer surface.

6. The cardiac stent-valve of claim 1, wherein at least one of the first and second sealing formations has a generally closed loop shape or a loop shape with one or more interruptions.

7. The cardiac stent-valve of claim 1, wherein at least one of the first and second sealing formations extends over at least 50% of an axial height of the structured sealing skirt.

8. The cardiac stent-valve of claim 1, wherein, in the expanded state, a height of at least one of the first and second sealing formations varies.

9. The cardiac stent-valve of claim 1, wherein, in the expanded state, at least one of the first and second sealing formations projects radially outward from the radially outer surface of the structured sealing skirt to a height of no more than 5 mm.

10. The cardiac stent-valve of claim 1, wherein the first and second sealing formations comprise material that is configured to expand or swell in response to contact with liquids.

11. The cardiac stent-valve of claim 1, wherein the first and second sealing formations comprise material chosen from open or closed cell porous material, wherein the open cell porous material is configured to facilitate endothelialization of the first and second sealing formations.

12. The cardiac stent-valve of claim 1, wherein the first and second sealing formations have a void content of more than 30%.

13. The cardiac stent-valve of claim 1, wherein the second sealing formation extends around the radially outer surface of the structured sealing skirt at a constant axial height.

14. A cardiac stent-valve for transcatheter delivery, the stent-valve being compressible to a compressed state for delivery, and expandable to an expanded state for implantation, the stent-valve comprising:
a stent with an axial inflow end and an axial outflow end, the stent comprising a lattice structure of cells defined by interconnected struts,
a plurality of leaflets arranged within the stent, and
a structured sealing skirt for reduction or prevention of paravalvular leakage;
wherein the structured sealing skirt comprises one or more sealing formations being arranged on a radially outer surface of the structured sealing skirt,
wherein, at least in the expanded state, at least one of the one or more sealing formations comprises a meandering shape having repeat units, wherein the repeat units have a different circumferential dimension than the cell width of the lattice structure of the stent,
wherein the meandering shape has a variable shaped cross-section.

15. The cardiac stent-valve of claim 14, wherein the repeat units have a smaller circumferential dimension than the cell width of the lattice structure of the stent.

16. The cardiac stent-valve of claim 14, wherein the repeat units have a larger circumferential dimension than the cell width of the lattice structure of the stent.

17. A cardiac stent-valve for transcatheter delivery, the stent-valve being compressible to a compressed state for delivery, and expandable to an expanded state for implantation, the stent-valve comprising:
a stent with an axial inflow end and an axial outflow end,
a plurality of leaflets arranged within the stent, and
a structured sealing skirt for reduction or prevention of paravalvular leakage;
wherein the structured sealing skirt comprises a first sealing formation and a second sealing formation, the first and second sealing formations being arranged on a radially outer surface of the structured sealing skirt at different axial heights,
the first sealing formation comprising U-shaped repeating units;
wherein, at least in the expanded state, the first and second sealing formations are shaped and arranged such that, at each axial level of the structured sealing skirt covered by first and second sealing formations, the fraction of the radially outer surface occupied by the first and second sealing formations is less than 100%;
wherein a cross-section of the first sealing formation is a different shape than a cross-section of the second sealing formation, wherein the cross-sections are taken parallel to a longitudinal axis of the cardiac stent-valve.

18. The cardiac stent-valve of claim 17, wherein at least one of first sealing formation and the second sealing formation has a cross-section that is asymmetric in the direction of the longitudinal axis of the cardiac stent-valve.

19. The cardiac stent-valve of claim 17, wherein one of the first sealing formation and the second sealing formation has an asymmetric cross-section in the direction of the longitudinal axis of the cardiac stent-valve and the other has a circular cross-section.

\* \* \* \* \*